(12) United States Patent
Vepa et al.

(10) Patent No.: US 11,967,318 B2
(45) Date of Patent: Apr. 23, 2024

(54) METHOD AND SYSTEM FOR PERFORMING SPEECH RECOGNITION IN AN ELECTRONIC DEVICE

(71) Applicant: Samsung Electronics Co., Ltd., Suwon-si (KR)

(72) Inventors: Jithendra Vepa, Bangalore (IN); Periyasamy Paramasivam, Bangalore (IN); Ramya Viswanathan, Bangalore (IN); Rajesh Krishna Selvaraj Krishnan, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 446 days.

(21) Appl. No.: 17/282,649

(22) PCT Filed: Dec. 19, 2019

(86) PCT No.: PCT/KR2019/018096
§ 371 (c)(1),
(2) Date: Apr. 2, 2021

(87) PCT Pub. No.: WO2020/145545
PCT Pub. Date: Jul. 16, 2020

(65) Prior Publication Data
US 2021/0350802 A1   Nov. 11, 2021

(30) Foreign Application Priority Data

Jan. 8, 2019   (IN) .............................. 201941000907

(51) Int. Cl.
*G10L 15/00*   (2013.01)
*G06F 11/34*   (2006.01)
(Continued)

(52) U.S. Cl.
CPC .......... *G10L 15/22* (2013.01); *G06F 11/3476* (2013.01); *G06N 20/00* (2019.01); *G10L 25/27* (2013.01); *G10L 2015/225* (2013.01)

(58) Field of Classification Search
CPC .......... G10L 15/30; G10L 15/32; G10L 15/34
See application file for complete search history.

(56) References Cited

U.S. PATENT DOCUMENTS 6,125,345 A    9/2000 Modi et al.
6,487,534 B1 * 11/2002 Thelen .................... G10L 15/26
                                                704/E15.047
(Continued)

FOREIGN PATENT DOCUMENTS

KR    10-2015-0134993 A    12/2015
KR    10-2016-0030168 A    3/2016

OTHER PUBLICATIONS

Indian Office Action dated Oct. 20, 2020, issued in Indian Application No. 201941000907.

*Primary Examiner* — Daniel Abebe
(74) *Attorney, Agent, or Firm* — Jefferson IP Law, LLP

(57) ABSTRACT

The present subject matter at least describes a method and a system (300, 1200) of performing speech-recognition in an electronic device having an embedded speech recognizer. The method comprises receiving an input-audio comprising speech at a device. In real-time, at-least one speech-recognition module is selected within at least one of the device and a server for recognition of at least a portion of the received speech based on a criteria defined in terms of a) past-performance of speech-recognition modules within the device and server; b) an orator of speech; and c) a quality of service associated with at least one of the device and a networking environment thereof. Based upon the selection of the server, output of the selected speech-recognition modules within the device are selected for processing by
(Continued)

corresponding speech-recognition modules of the server. An uttered-speech is determined within the input-audio based on output of the selected speech-recognition modules of the device or the server.

15 Claims, 12 Drawing Sheets

(51) Int. Cl.
*G06N 20/00* (2019.01)
*G10L 15/22* (2006.01)
*G10L 25/27* (2013.01)

(56) References Cited

U.S. PATENT DOCUMENTS

| | | | | |
|---|---|---|---|---|
| 7,933,777 | B2 * | 4/2011 | Koll | G10L 15/30 |
| | | | | 704/270.1 |
| 8,589,156 | B2 * | 11/2013 | Burke | G10L 15/30 |
| | | | | 704/231 |
| 8,898,065 | B2 | 11/2014 | Newman et al. | |
| 9,070,367 | B1 | 6/2015 | Hoffmeister et al. | |
| 9,761,227 | B1 | 9/2017 | Quillen et al. | |
| 2006/0009980 | A1 * | 1/2006 | Burke | G10L 15/30 |
| | | | | 704/E15.047 |
| 2012/0191448 | A1 | 7/2012 | Lloyd et al. | |
| 2014/0163977 | A1 | 6/2014 | Hoffmeister et al. | |
| 2017/0206903 | A1 | 7/2017 | Kim et al. | |
| 2017/0229122 | A1 * | 8/2017 | Juneja | H04L 43/0894 |
| 2018/0330714 | A1 * | 11/2018 | Paulik | G10L 15/16 |
| 2018/0342236 | A1 * | 11/2018 | Ryu | G10L 15/08 |
| 2021/0166699 | A1 * | 6/2021 | Willett | G10L 15/1815 |

* cited by examiner

User resorting to "shouting" owing to dissatisfaction
(a)

User repeating the "uttered" query
(b)

METHOD AND SYSTEM FOR PERFORMING SPEECH RECOGNITION IN AN ELECTRONIC DEVICE

CROSS-REFERENCE TO RELATED APPLICATION(S)

This application is a U.S. National Stage application under 35 U.S.C. § 371 of an International application number PCT/KR2019/018096, filed on Dec. 19, 2019, which is based on and claims priority of an Indian patent application number 201941000907, filed on Jan. 8, 2019, in the Indian Intellectual Property Office, the disclosure of which is incorporated by reference herein in its entirety.

TECHNICAL FIELD

The present invention relates to speech-recognition systems and in-particular relates to artificial-intelligence (AI) enabled speech-recognition systems.

BACKGROUND ART

Human-computer interactions have progressed to the point where humans can control computing devices, and provide input to those devices, for example by speaking. Computing-devices employ techniques to identify the words spoken by a human-user based on the various qualities of a received audio-input. Such techniques are called speech-recognition or automatic speech recognition (ASR). Speech recognition combined with language-processing techniques may allow a user to control a computing-device to perform tasks based on the user's spoken-commands. Speech recognition may also convert a user's speech into text-data which may then be provided to various text-based programs and applications.

The voice recognition market is growing by leaps and bounds and is finding application in almost every device provided with an embedded system. For example, speech-recognition is being used by computers, hand-held devices, telephone computer-systems, kiosks, and a wide-variety of other devices to improve human-computer interactions. Off late, hybrid-architectures (i.e. combination of the device and the remote-server) have evolved to delegate some or all of the speech recognition processing responsibility to a speech recognition server that is located remotely from the embedded-device and has significantly greater computing resources than the embedded device. At-least a reason may be attributed to the usage of external devices such as server at least based on "Memory", "Speed-constraints", "capability" of the device. Accordingly, while the acoustic model (AM) on the device can detect limited set of sounds-states, the acoustic-model (AM) at server is further able to detect many-more states for being based up on a deep-network and multiple nodes per-layer. Another example-manifestation of such capability difference between the device and the server is that while the language module (LM) of the device has a vocabulary in the order of few thousand words, the LM of the server may have a vocabulary in the order of million words. Accordingly, for any given speech, the server is usually observed as a far accurate and precise sound-recognizer when compared with device at user-end.

During operation of the aforesaid hybrid systems, as the user speaks into the embedded-device, many a times the embedded device does not attempt to recognize the speech using its own computing resources owing to its incapacity towards recognizing the speech. As illustrated in Scenario 1 of FIG. 1, when the sound-recognition through the device drops by a significant large extent, the device transmits the speech (or a processed form of it) over a network-connection to the speech-recognition server. The server recognizes the speech using its greater computing resources and therefore produces the recognition results that the embedded device would have all-together failed to produce. The speech recognition server then transmits the results back over the network connection to the embedded device.

DISCLOSURE OF INVENTION

Technical Problem

While such technique may be a low-cost mechanism since it avails the services of server as and when required (e.g. when the device is incapable for sound recognition), the same suffers from high-latency as and when data is sent for processing to server. Even if the Scenario 2 as depicted in FIG. 1 is employed to reduce the latency, wherein the input acoustic-signal is simultaneously sent to the computing device and the server in all circumstances, the same entails high-costs as compared to Scenario 1 since server now acts a participant in all circumstances irrespective of complexity.

Moreover, the hybrid-systems in both scenarios largely adopt a rigid sound-recognition criteria for all types of speech, circumstances, and locations, and fail to adjust their criteria automatically. In an example, whether the inputted speech carries a lot of background noise or has been produced with a high amount of echo, the sound-decoder selection as adopted either by device or server remains unaffected and static. In other example, the conventional hybrid systems have been observed to be non-receptive to user feedback (e.g. shouting or repetition) and accordingly do not adjust their operation based thereupon.

Furthermore, the conventional hybrid systems execute their sound recognition criteria irrespective of the make or type of the device and thereby fail to live up-to the quality of service as otherwise anticipated from the device. In an example, with respect to a given speech, the hybrid sound recognition systems implemented with respect to a household washing machine and a state of the art smartphone (for business purposes) tend to operate 'equivalently' without any adoption of device based discretion.

Furthermore, the hybrid systems in the example scenarios of FIG. 1 do not allow a re-use of computations between the computing device and the server. More specifically, conventional hybrid systems involve an independent execution of the device and the server without any synergistic operation there-between. Accordingly, duplicity of computations due to independent operation at both levels is usually caused, thereby causing latency.

At least by virtue of aforesaid shortcomings, an overall efficiency and accuracy of the conventional hybrid sound recognition systems remains low.

Solution to Problem

This summary is provided to introduce a selection of concepts in a simplified format that are further described in the detailed description of the invention. This summary is not intended to identify key or essential inventive concepts of the claimed subject matter, nor is it intended for determining the scope of the claimed subject matter.

In accordance with an embodiment of the invention, the present subject matter describes a method of performing speech-recognition in an electronic device having an embedded speech recognizer. The method comprises receiving an input-audio comprising speech at a device. In real-time, at-least one speech-recognition module is selected within at least one of the device and a server for recognition of at least a portion of the received speech based on a criteria defined in terms of a) past-performance of speech-recognition modules within the device and server; b) an orator of speech; and c) a quality of service associated with at least one of the device and a networking environment thereof. Based upon the selection of the server, output of the selected speech-recognition modules within the device are selected for processing by corresponding speech-recognition modules of the server. An uttered-speech is determined within the input-audio based on output of the selected speech-recognition modules of the device or the server.

In accordance with another-embodiment of the invention, the present subject matter describes a system for performing speech recognition in an electronic device having an embedded speech recognizer. The system comprises an acoustic sensor for receiving an input-audio comprising speech at a device. A selection-module is provided for selecting in real-time at least one speech-recognition module within at least one of the device and a server for recognition of at least a portion of the received speech based on a criteria. The criteria is defined in terms of at least one of a) past-performance of speech-recognition modules within the device and server; b) an orator of speech; and c) a quality of service associated with at least one of the device and a networking environment thereof. In an example, the real-time selection between the device and the server may be executed based on execution of a machine-learning algorithm followed by the execution of said criteria. Said ML algorithms may be supervised, unsupervised, reinforced and may include neural-networks (DNN, RNN, LSTM etc), decision tress, Naive Bayes Classification, Ordinary Least Squares Regression, Logistic Regression etc.

A communication module is provided for sending output of one or more of the selected speech-recognition modules within the device for processing by corresponding speech-recognition modules of the server based upon the selection of the server. Finally, a speech-determiner module (which may be interchangeably referred as a speech recognizer module) is provided for determining uttered-speech within the input-audio based on output of the selected speech-recognition modules of the device or the server.

The present subject matter at-least renders a mechanism that intelligently switches between server and on-device algorithms, re-uses the computations between server and on-device algorithms, and incorporates a fine-grained QoS control. Furthermore, an overall accuracy is high, while substantially low latency is observed.

To further clarify the advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

Figure 3:
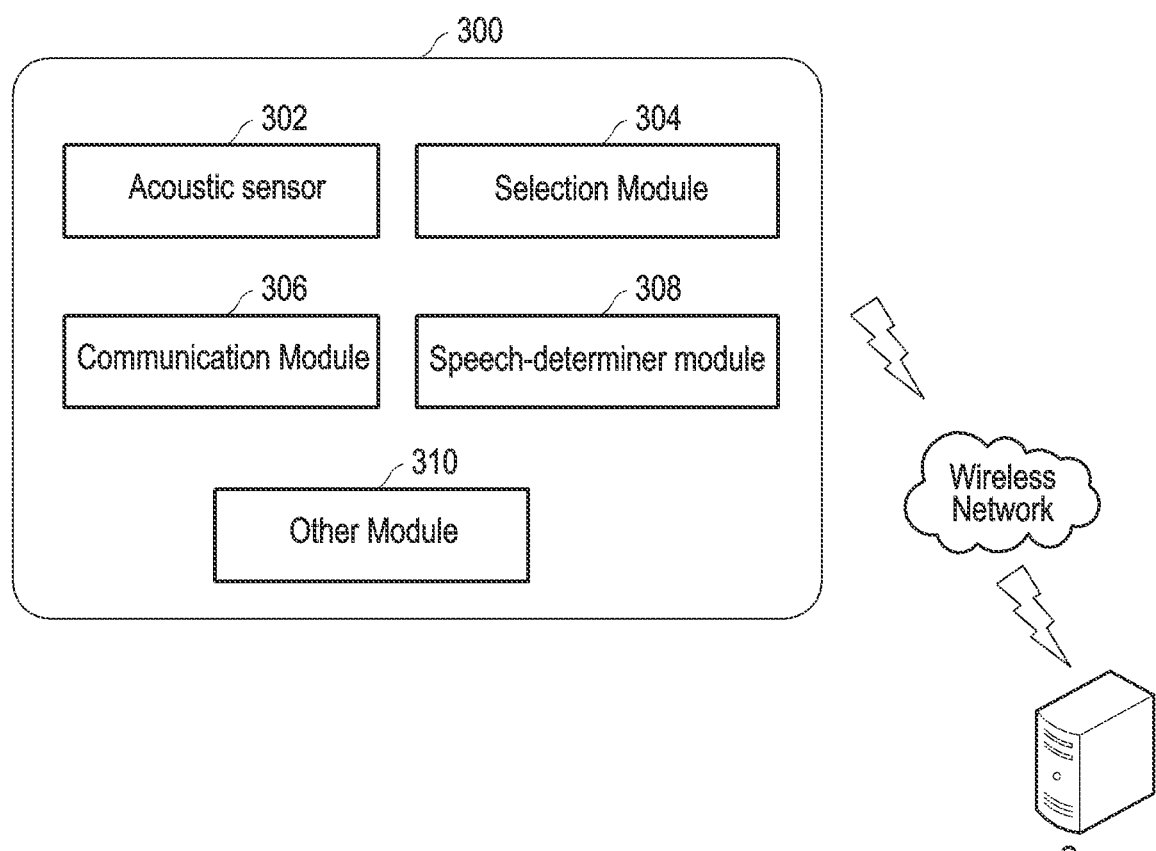
FIG. 3 shows a system in accordance with an embodiment of the present invention.
Figure 9:
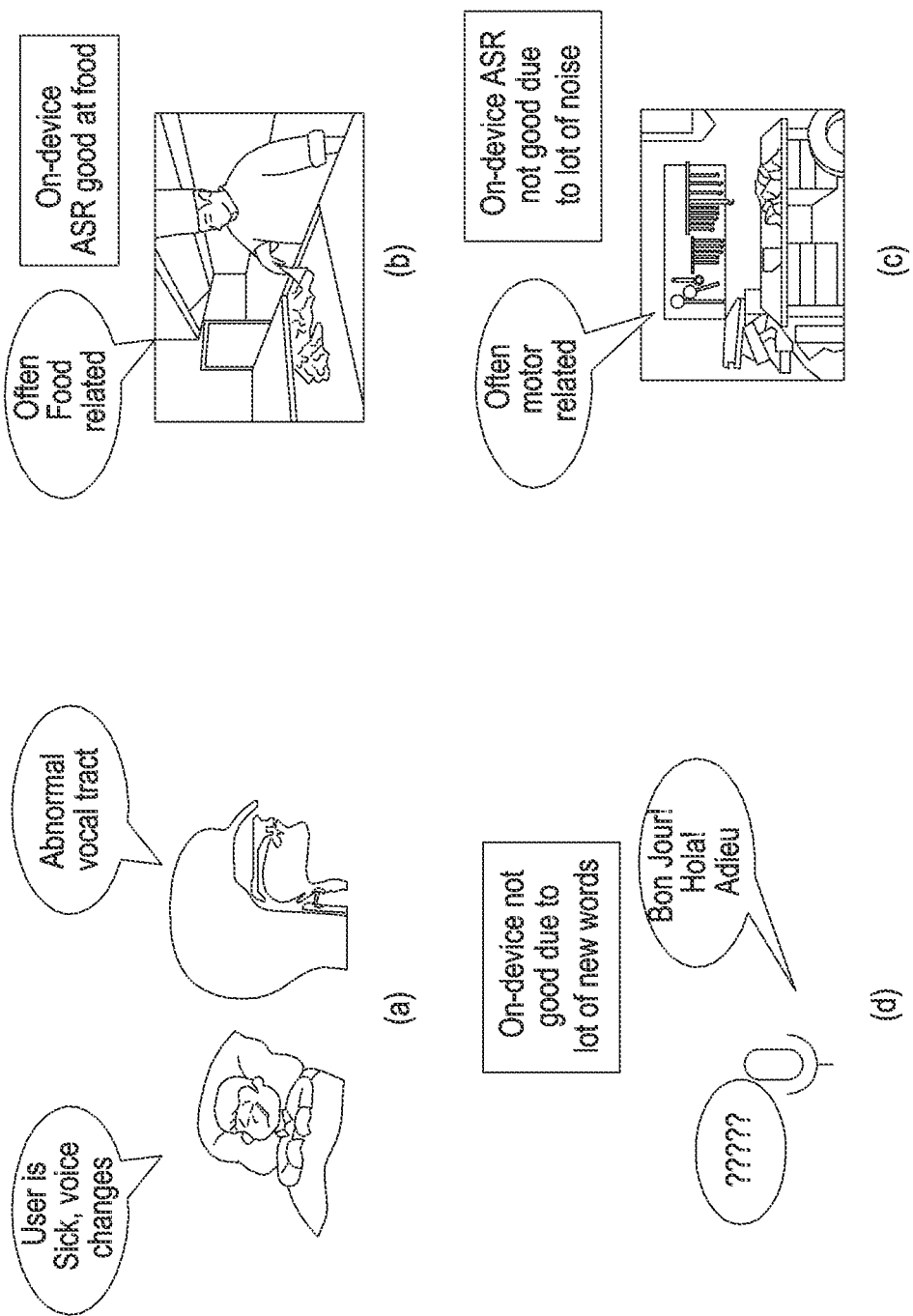
Figure 10:
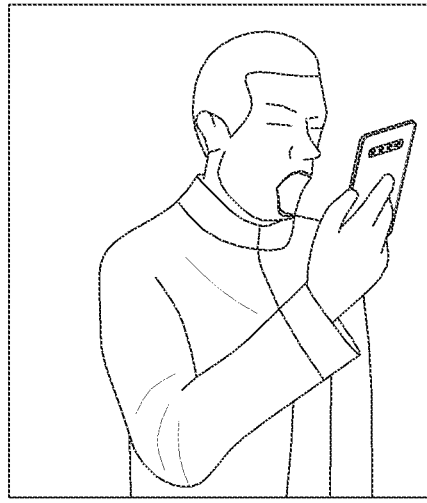
Figure 10:
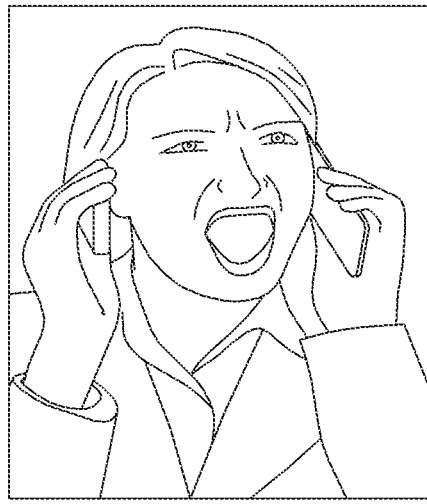
Figure 11:
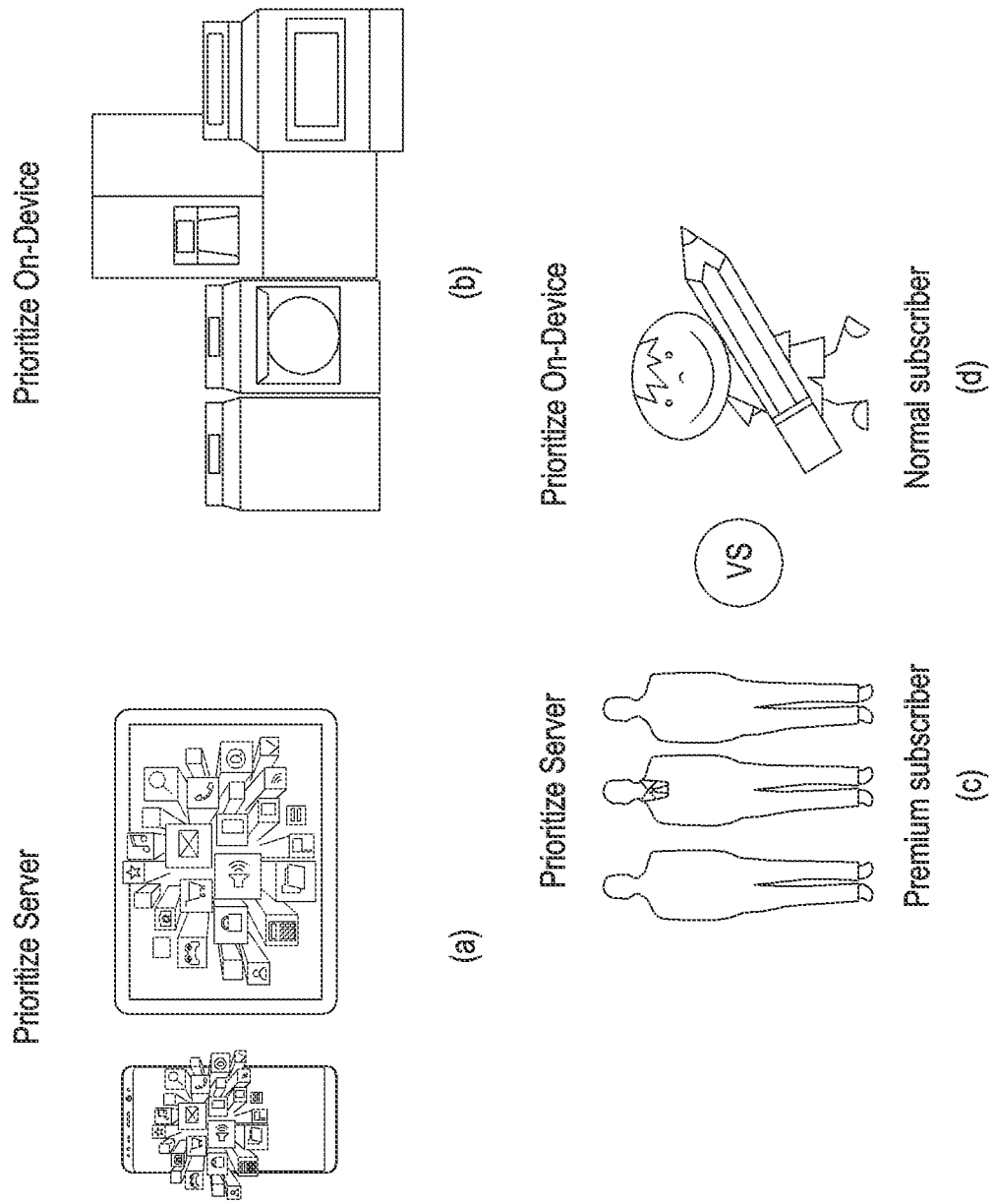
Figure 12:
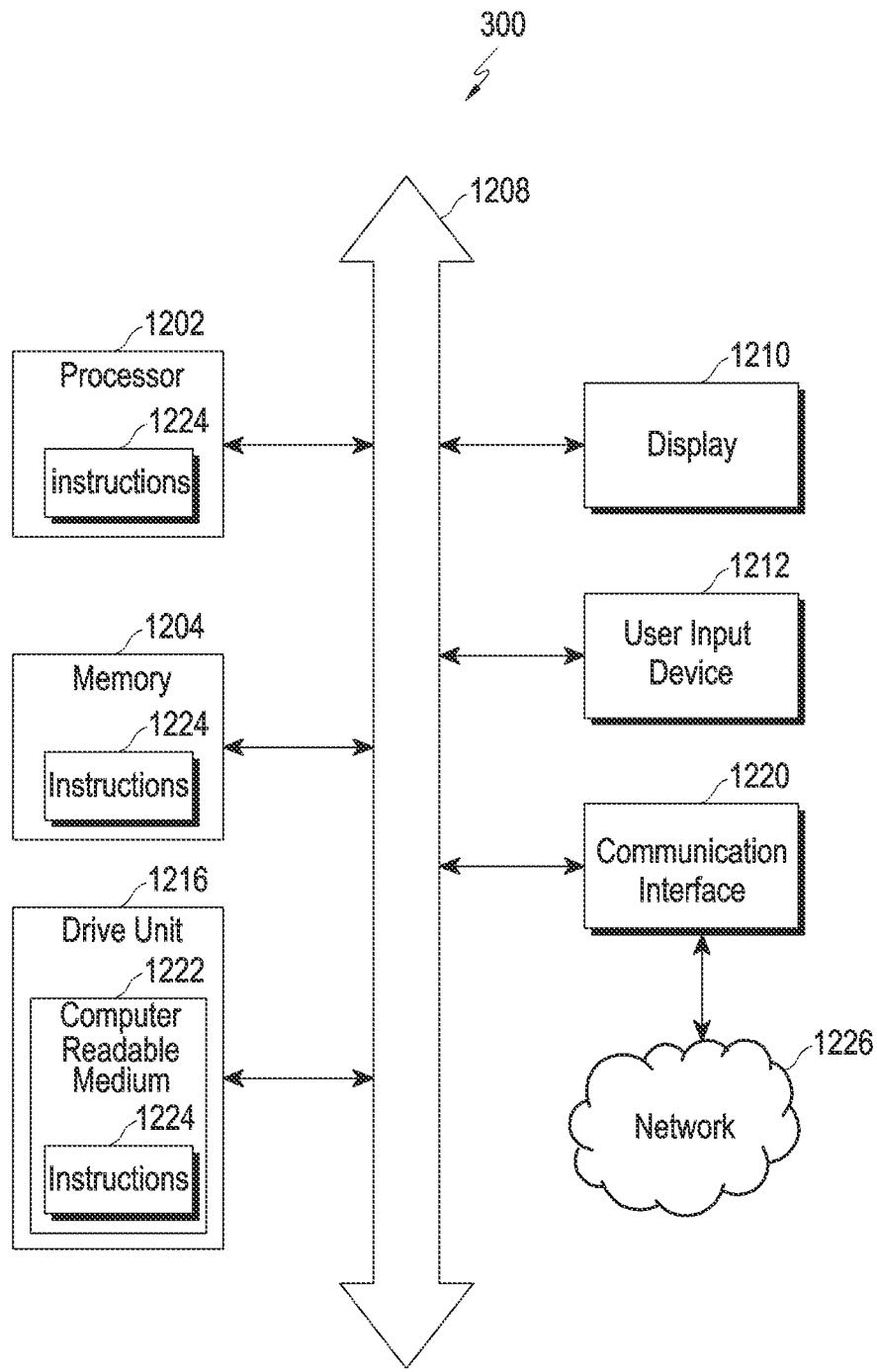

Part (a) to part (d) of FIG. 9 illustrate an example-operation in accordance with the present subject matter;

Part (a) and part (b) of FIG. 10 illustrate another example-operation in accordance with the present subject matter, in accordance with an embodiment of the present subject matter;

Part (a) to part (d) of FIG. 11 illustrate another example-operation in accordance with the present subject matter;

FIG. 12 shows an example computing-device based implementation of the system as depicted in FIG. 3, in accordance with the embodiment of the present subject matter.

MODE FOR THE INVENTION

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are explanatory of the invention and are not intended to be restrictive thereof.

Reference throughout this specification to "an aspect", "another aspect" or similar language means that a particular feature, structure, or characteristic described in connection with the embodiment is included in at least one embodiment of the present invention. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this invention belongs. The system, methods, and examples provided herein are illustrative only and not intended to be limiting.

Embodiments of the present invention will be described below in detail with reference to the accompanying drawings.

Figure 1:
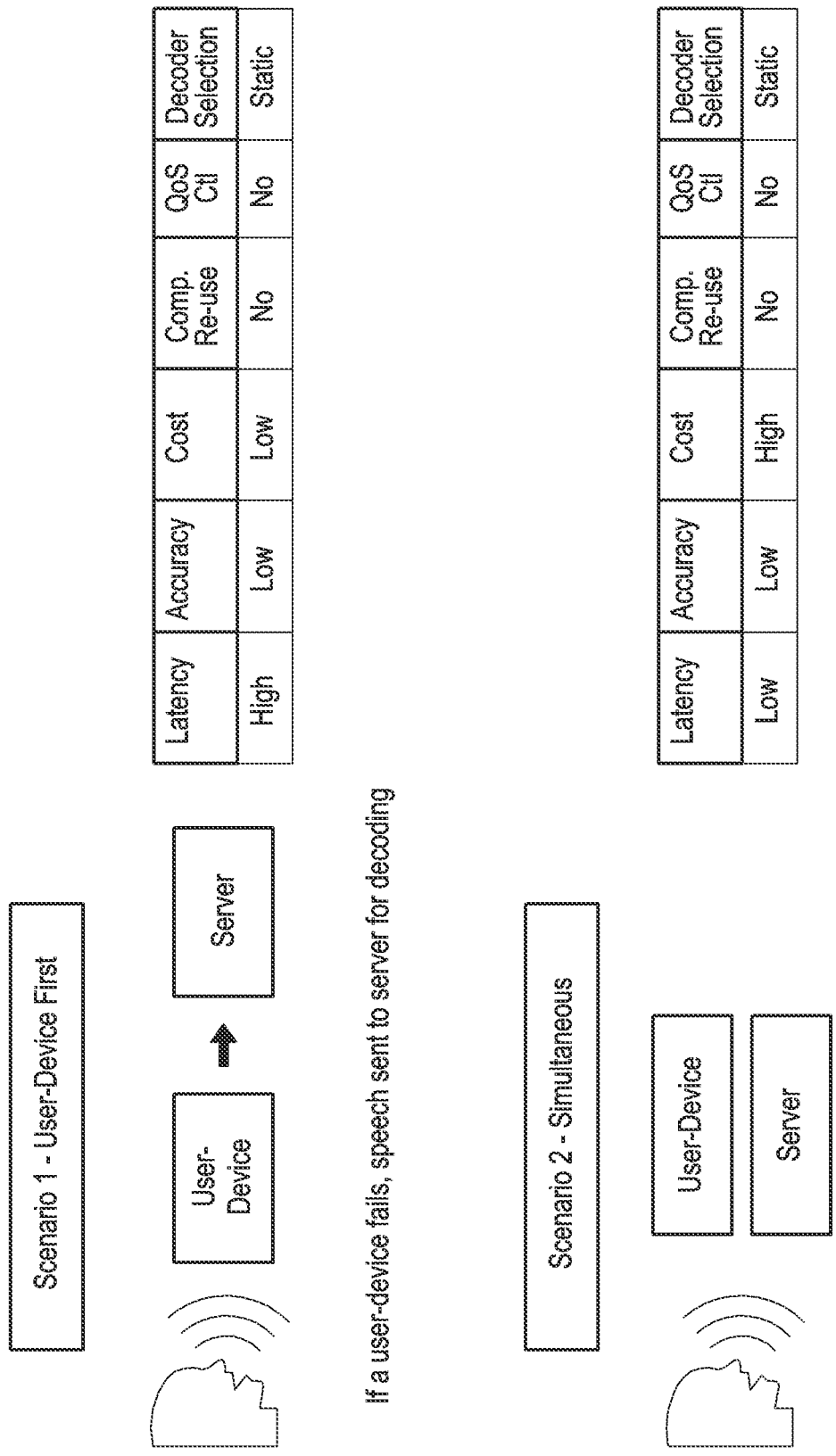
FIG. 1 shows a prior art mechanism of speech-recognition.
Figure 2:
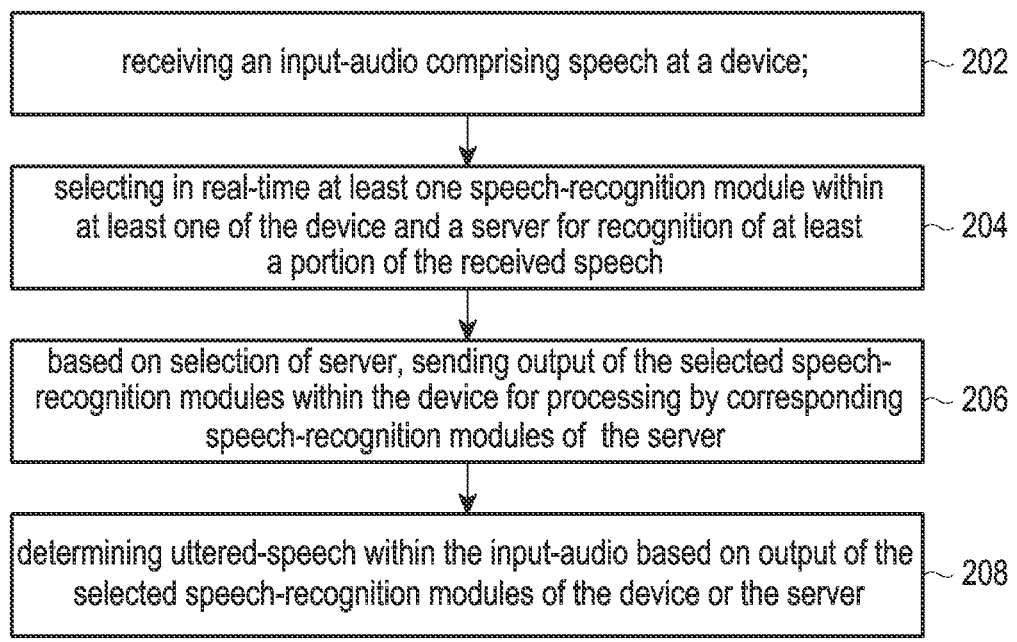
FIG. 2 shows method steps in accordance with an embodiment of the invention.

FIG. 2 illustrates a method of performing speech recognition in an electronic device having an embedded speech recognizer or a set of automatic speech recognition (ASR) modules. The method comprises receiving (step 202) an input-audio comprising speech at a device.

Based on the received input-audio, at least one speech-recognition module or ASR module is selected (step 204) in real-time within at least one of the device and a server for recognition of at least a portion of the received speech. In an example, the speech-recognition module within the device or server may be one or more of: a pre-processing model, an acoustic-model (AM), a language-model (LM), an inverse text normalization model (ITN); and a natural language understanding (NLU) model. The selection is made based on past-performance of speech-recognition modules within the device and server.

The past-performance of modules is captured and recorded in respect of at least one of: an environment comprising multiple orators, a location of the orator, a time of the day when the speech is received from the orator, an orator of speech; and a quality of service associated with at least one of the device and a networking environment thereof. The criteria pertaining to the orator relates to a feedback received therefrom as at-least one of repetition of the speech by the orator, repetition of the speech with increased loudness, and an increased loudness from the orator later during the speech. The quality of service is defined based on at least one of a configuration of the device defined by at-least one of nature, type, category, characteristic of the device. Further, the quality of service may be defined based on a user-subscription with respect to the device, a current-occupancy of the server, a current-occupancy of the network connecting the server and the device, etc. In yet another example, the real-time selection between the device and the server is further based on execution of a machine-learning algorithm followed by the defined criteria.

In case of the selection of server as a result of real-time selection, the output of the selected speech-recognition modules within the device is sent (step 206) for processing by corresponding speech-recognition modules of the server. Such selection in real-time is preceded by a real-time calculation of buffering and processing thresholds as the criteria for the speech-recognition by the server.

As a part of further embodiments, the selection between the device and server as done in real-time comprises prioritizing one or more speech-recognition modules within the server for processing the received speech based on observing performance of the speech-recognition modules of the device with respect to one or more scenarios pertaining to the receipt of the speech from the orator. In case of degradation of the performance, the buffering and processing threshold associated with the server are modified to thereby facilitate the server at processing the speech in said one or more scenarios.

In other example, the selection between the device and server as done in real-time comprises prioritizing one or more speech-recognition modules within the server for processing the received speech based on observing performance of the speech-recognition modules in the device and server with respect to one or more locations of the receipt of the speech. In case of degradation of the performance, the buffering and processing threshold associated with the server are modified to thereby facilitate the server for processing the speech in respect of said one or more locations.

In yet another example, the selection in real-time comprises prioritizing one or more speech-recognition modules within the server for processing the received speech based on observing a repetition of the speech, a loudly uttered speech or a combination thereof in respect of the speech received from the orator. The pre-processing to be done by the server is prioritized based on detecting substantial background-noise with respect to the received speech. A language model is prioritized within the server as the speech recognition module based on detection of linguistically different terms within the received speech.

Finally, based on output of the selected speech-recognition modules within the device or the combination of the device and the server, the uttered-speech is determined (step 208) within the received input-audio.

FIG. 3 illustrates a detailed internal construction of a system 300 in accordance with the embodiment of the present invention. The system 300 includes an acoustic sensor 302 that performs the step 202, a selection-module 304 that performs the step 204, a communication module 306 that performs the step 306, a speech-determination/speech-recognizer module 308 that performs the step 308. Likewise, there may be other modules 310 within the system 300 that facilitate the operational interconnection among the modules 302 till 308, and perform other ancillary-functions. The system 300 is wirelessly networked with a server which may be geographically-separated from the system 300.

Figure 4:
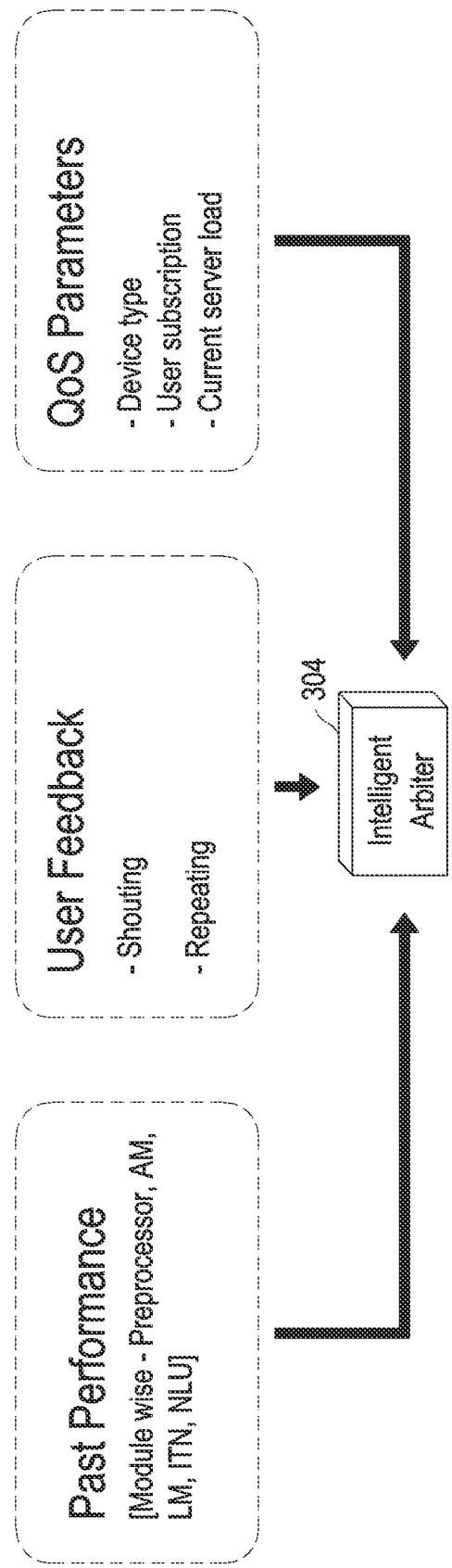
FIG. 4 shows an example-implementation of method-steps of FIG. 2 in accordance with the embodiment of the invention.

FIG. 4 shows an example-implementation of method-steps of FIG. 2 in accordance with the embodiment of the invention. More specifically, the present implementation depicts an example operation of the steps 202 and 204 of FIG. 2 and accordingly represents the operation of selection module 304, hereinafter referred to as 'arbiter' 304.

The arbiter 304 receives the acoustic/audio-signal containing the speech through a microphone or acoustic-sensor. In addition, the arbiter 304 also gathers the 'user-feedback' in the form of 'shouting' or 'repetition of words' and accordingly gauges the feedback from the user.

Further, the 'arbiter' 304 also captures the location and time of the day associated with the received audio-speech through state-of-the art components of a computing-device. In addition, the 'arbiter' also detects if the computing-device receiving the audio-speech is a shared or multi-user device.

Based thereupon, the arbiter 304 also fetches a past-performance or historically-recorded performance of the sound recognition modules such as a pre-processing model, an acoustic-model (AM), a language-model (LM), an inverse text normalization model (ITN); and a natural language understanding (NLU) model, with respect to the present device in term of the currently noted day/time and other prevailing-conditions or configuration as associated with current device.

Furthermore, the 'arbiter' 304 also receives 'quality of service' (QoS) based parameters as associated with the current computing device based on device-related parameters.

In an example, the device may be either a computing device such as a smartphone, tablet, smartwatch or a desktop station. In other example, the device may be IoT enabled electromechanical-device such as washing-machines, refrigerator, etc. With reference to such examples, a determination of QoS as done by the arbiter 304 includes capturing the type of user-subscription (premium or regular), a current-occupancy or fitness of the server to perform sound-recognition. Based upon the same, the arbiter 304 evaluates the QoS as deserved by the device.

Figure 5:
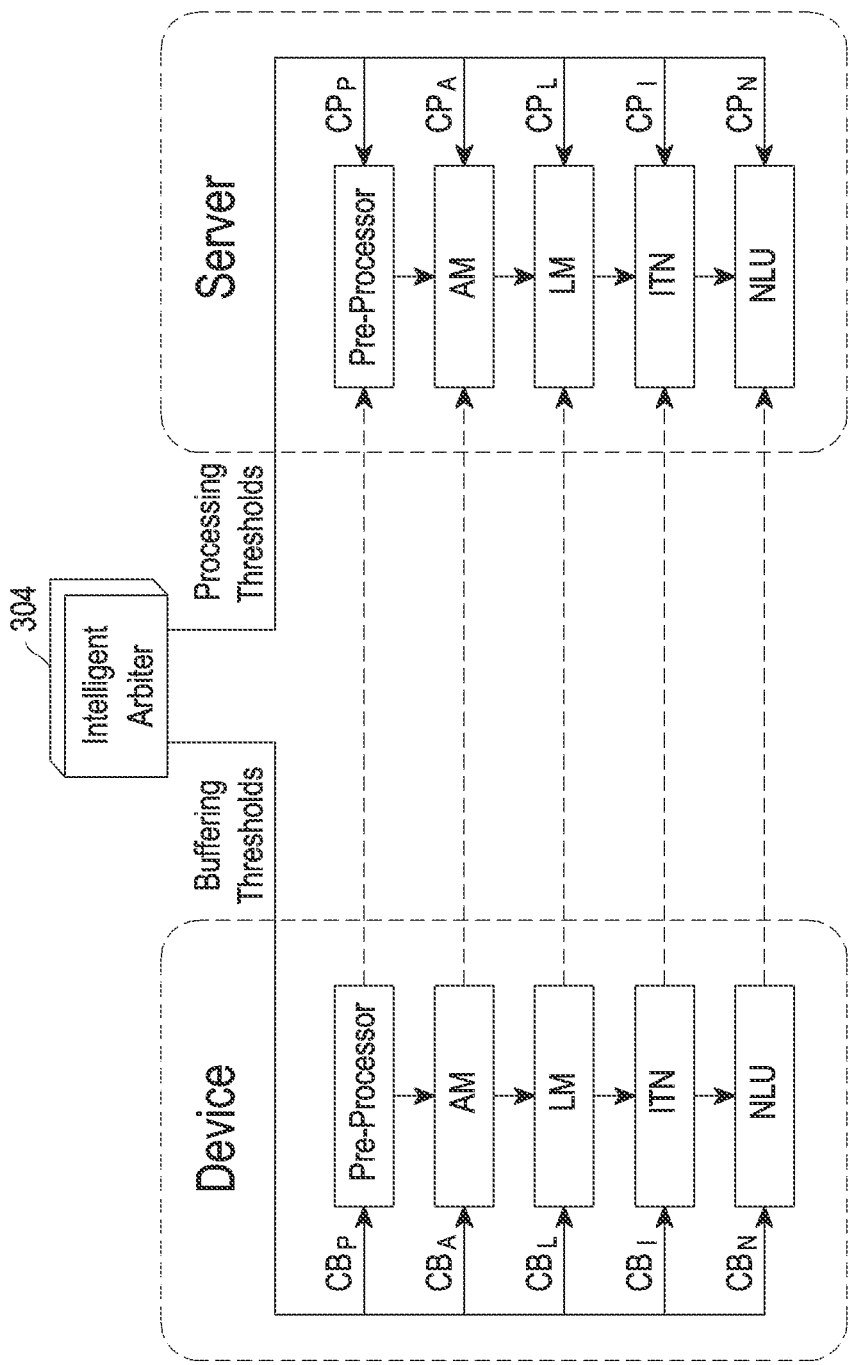
FIG. 5 shows an extended implementation of FIG. 4, in accordance with the embodiment of the invention.

FIG. 5 shows a further implementation of FIG. 4, wherein the arbiter 304 dynamically calculates a plurality of buffering threshold values ($CB_P$, $CB_A$, $CB_L$, $CB_I$, $CB_N$) and processing threshold values ($CP_P$, $CP_A$, $CP_L$, $CP_B$ $CP_I$, $CP_N$) in real-time based upon the inputs as captured and computations as done in respect of FIG. 4, in accordance with the embodiment of the invention. Accordingly, the present description also corresponds to step 204 of FIG. 2, since it contributes to the decision making behind the selection of either the device or the server.

The buffering threshold values ($CB_P$, $CB_A$, $CB_L$, $CB_B$ $CB_I$, $CB_N$) and processing threshold values ($CP_P$, $CP_A$, $CP_L$, $CP_L$ $CP_N$) correspond to the thresholds with respect to the various automatic speech-recognition modules such as pre-processing module (PM), acoustic module (AM), language model (LM), inverse text normalization (ITN) module and natural language understanding (NLU) module, respectively.

Further, the arbiter 304 dynamically calculates confidence-parameter 'C', which represents a confidence shown by the arbiter 304 in respect of each of ASR modules (e.g. PM, AM, LM, ITN etc) for recognizing speech as present within the current input-audio. In other words, 'C' represents an overall speech recognition capability with respect to each of the ASR modules within the device. In an example, the confidence parameter 'C' may be calculated largely based on the historical performance of the device in respect of the currently prevailing conditions (i.e. time, day) and state (configuration) of the device.

As later elaborated in FIG. 7, the buffering and processing thresholds individually represent a threshold value $CP_X$ or $CB_X$ which may exceed the calculated 'C' by in order to get the speech interpreted by a specific ASR module of the server.

Figure 6:
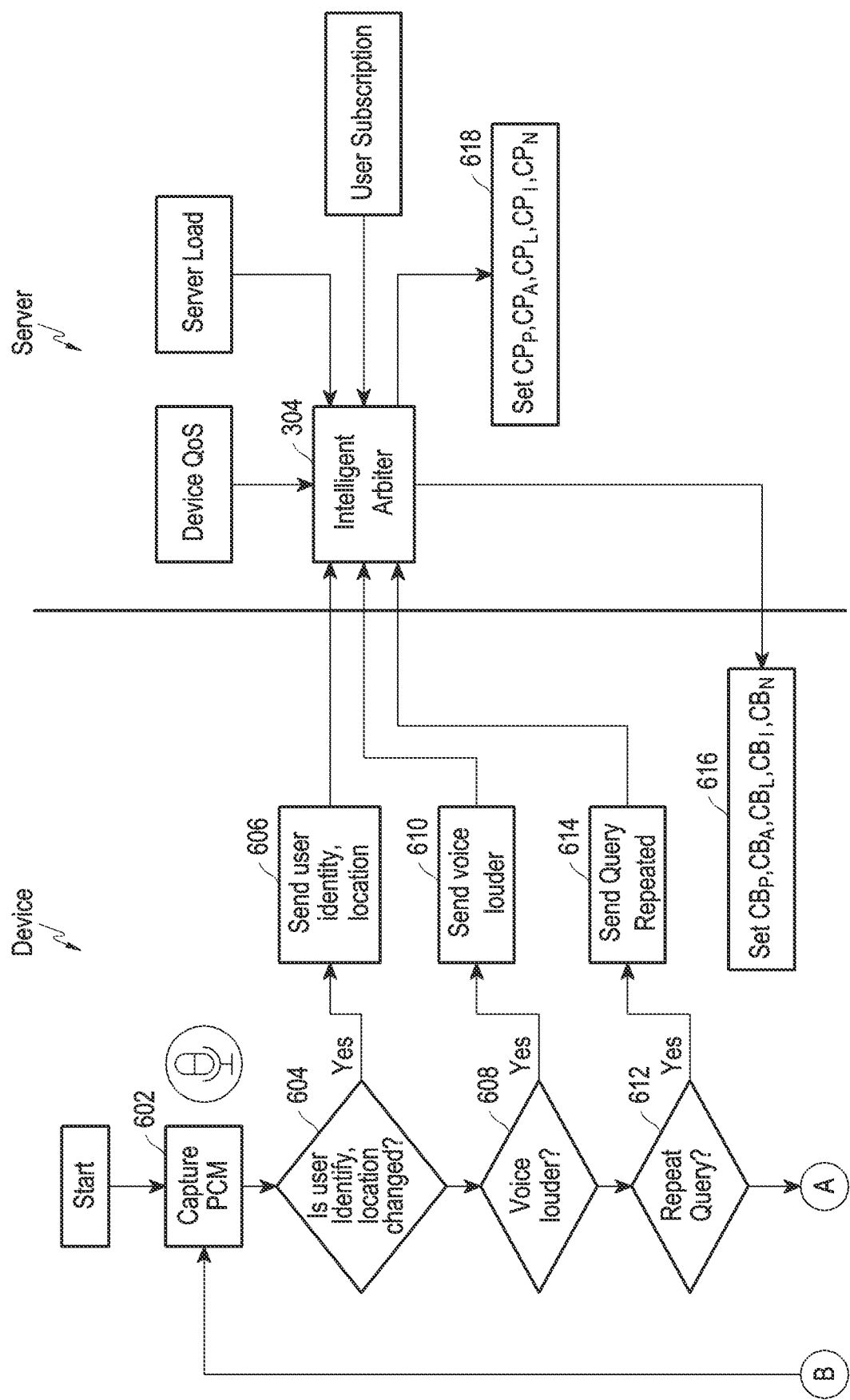
FIG. 6 shows a detailed implementation of FIG. 4, in accordance with the embodiment of the invention.

FIG. 6 shows an example-implementation of FIG. 4 through method-steps, in accordance with the embodiment of the invention. Alternatively, FIG. 6 represents the steps 202 and 204 of FIG. 2.

Step 602 represents receiving an audio-signal as captured by a microphone or the acoustic-sensor as a pulse coded modulation (PCM) form.

Based on the gathered PCM form, an identity of the user may be gathered based on historical records. For example, presence of an owner-user or the frequent user of the device may be identified based on the received speech in the audio signal. Likewise, it may be detected based on the PCM that although the person uttering the speech is identifiable, but the uttered speech is different in pitch and frequency since the person is sick (e.g. having a sore-throat). Further, the location where the speech has been uttered may also be identified based on the received-speech.

In addition, apart from location and identity, it may be further ascertained from the PCM or the analog audio if the uttered speech is louder than usual, or whether there has occurred a repetition of words/phrases within the speech.

Steps 604 and 606 represents communicating to the arbiter 304 that the uttered-audio from the user is no longer from the regularly observed person and accordingly different from the utterance received in the past. Moreover, even if the regularly observed user has uttered speech but is "sick", then the same is also communicated to the arbiter 304. Likewise, in case the location where the speech has been uttered has changed in terms of either form or place (e g change of venue), then the same is also communicated to the arbiter 304.

Steps 608 and 610 represent communicating change in loudness of the uttered-speech to the arbiter 304.

Step 612 and 614 represent communicating repetition of the words/phrases within the speech to the arbiter 304.

Accordingly, the arbiter 304 receives the speech related parameters (i.e. acoustic and PCM related) through the previously depicted steps 604, 606, 608, 610, 612 and 614. Moreover as already explained with respect to FIG. 4, the arbiter 304 also automatically captures the parameters pertaining to the device and networking environment such as QoS parameters, the user-subscription associated with the device, existing server-load etc.

At least based on aforesaid, the arbiter 304 dynamically thereafter calculates or sets the buffering-threshold values ($CB_P$, $CB_A$, $CB_L$, $CB_I$, $CB_N$) and processing-threshold values ($CP_P$, $CP_A$, $CP_L$, $CP_B$ $CP_I$, $CP_N$) to predefined values. In addition, the confidence parameter, 'C' is ASR module specific and accordingly calculated in respect of each of the ASR modules under consideration. As aforesaid, the confidence-parameter 'C' represents a capability of the particular ASR module to interpret audio the speech as hidden within the audio.

Figure 7:
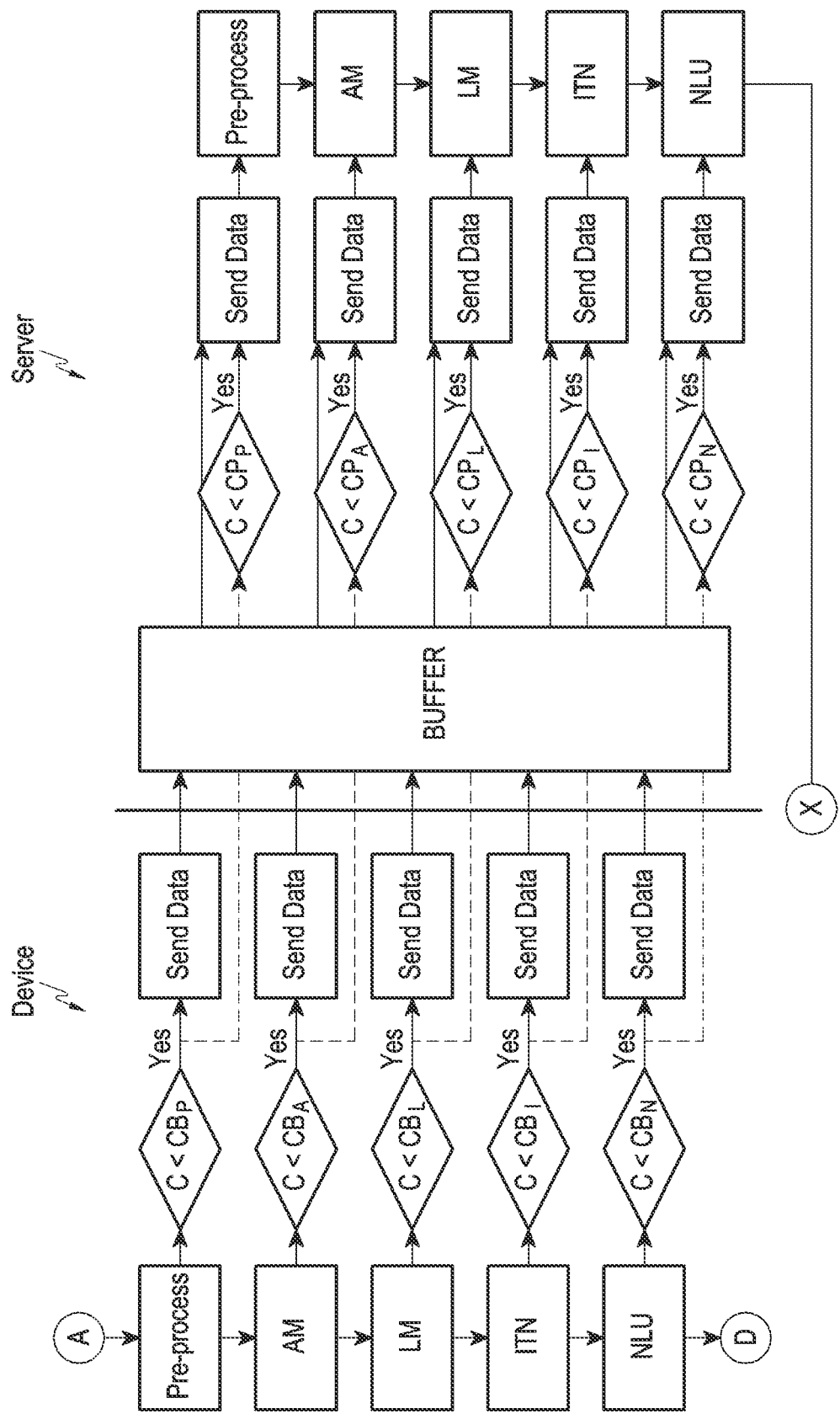
FIG. 7 shows further extension of the control flow of FIG. 6 and an example-implementation of FIG. 5, in accordance with the embodiment of the invention.

FIG. 7 shows further extension of the control flow of FIG. 6 and an example-implementation of FIG. 5, in accordance with the embodiment of the invention. Alternatively, FIG. 7 corresponds to the step 206 of FIG. 2.

Overall, FIG. 7 represents sending the output of one or more ASR modules of the device to the buffer of the server as "Data", in case the corresponding buffering threshold values ($CB_P$, $CB_A$, $CB_L$, $CB_I$, $CB_N$) exceed the confidence parameter 'C'. In an example, if $CB_P<C$, but $CB_A>C$, then only the output of the "Acoustic-module" of the device is sent to the buffer of the server.

From the buffer of the server, the respective one or more outputs of the ASR modules of the device (as currently present in the buffer) are transferred for processing by corresponding ASR modules of the server, in case the processing thresholds values ($CP_P$, $CP_A$, $CP_L$, $CP_B$ $CP_I$, $CP_N$) exceed the respective confidence parameter "C".

In an example, if $CP_P<C$, but $CP_A>C$, then only the output of the "Acoustic-module" of the device as maintained within the buffer is sent for processing by the corresponding ASR module, i.e. Acoustic module of the server. However, in such a scenario, output of the pre-processing module of the device is maintained within the buffer. In this manner, only the output of selected ASR modules from the device get transmitted for processing by the corresponding ASR modules, and such type of output that have managed to reach buffer but are non-desired (for processing by server) remain in server.

As represented by the 'dotted lines or broken lines", the value of C, ($CB_P$, $CB_A$, $CB_L$, $CB_I$, $CB_N$), ($CP_P$, $CP_A$, $CP_L$, $CP_B$, $CP_I$, $CP_N$) keep on getting updating. Accordingly, during the course of speech-recognition, data from different ASR modules of the device keep on reaching the ASR module of the server either simultaneously or at different instants of time. In an example, following example scenarios are possible:

☐) None of the ASR modules of the device sending output to the server

☐) All of the ASR modules of device sending output to the server

☐) At a particular instant, only a handful of the ASR modules of device sending output to the server ☐) Owing to a continuous update in threshold values by the arbiter 304, majority of ASR module of device start sending output to the server at an instant next to the one defined by point iii).

☐) Upon reaching the server, part of the output of ASR modules of the device reside within the buffer of the server, while another part get processed immediately by selected ASR modules of the server.

☐) The outputs that could not be processed in point v) later on get processed by the server, as and when either of the corresponding processing threshold value gets increased or the confidence value 'C' gets lowered.

The final outcome of the ASR modules of the device and the server are represented as 'D' and 'X' respectively.

Figure 8:
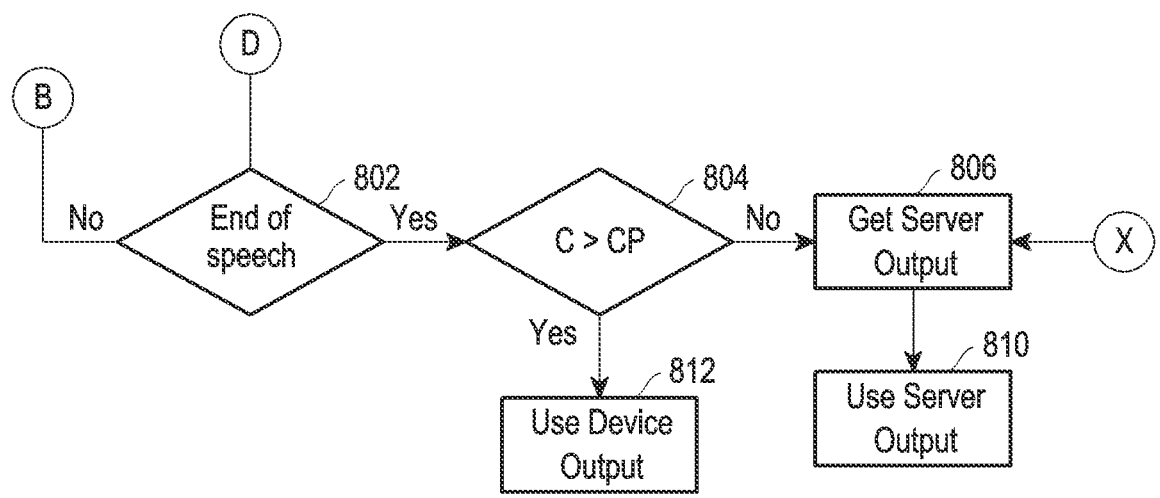
FIG. 8 shows further-extension of the control-flow of FIG. 7 and an example-implementation of FIG. 5, in accordance with the embodiment of the invention.

FIG. 8 shows further-extension of the control-flow of FIG. 7 and an example-implementation of FIG. 5, in accordance with the embodiment of the invention. Alternatively, FIG. 8 corresponds to the step 208 of FIG. 2.

At step 802, the output from the ASR modules in the device as depicted in FIG. 7 is received and it is checked if the speech has ended within the audio-signal. If not, then the control-flow proceeds back to step 602 of FIG. 6 and the receipt of incoming-audio as the pulse-coded-modulation (PCM) signal is continued. If yes, then the control-flow proceeds to step 804.

At step 804, it is checked if the currently determined confidence—'C' for the module under consideration is less than the "processing threshold" ($C_p$) as associated with the corresponding module of the "Server". If yes, then the control-flow proceeds to step 812, else the flow proceeds to the step 806.

At step 806, the output of the ASR modules as represented by the symbol 'X' is gathered from the server and used for representing speech-recognition results via step 810 in response to the user-uttered speech.

At step 812, the output of the ASR modules of the device is gathered and used for representing speech-recognition results.

As will evident from forthcoming figures, either of the results as illustrated in step 812 and 810 are utilized with respect to given scenario.

Part (a) to part (d) of FIG. 9 illustrate an example-operation in accordance with the present subject matter, thereby depicting the step 204, i.e. the decision-making for selecting the ASR (automatic speech recognition) mechanism of either the device or the server with respect to various scenarios.

As indicated in part (a) of FIG. 9, there are scenarios wherein the user is sick and accordingly utters a highly distorted speech while speaking. In other scenario, the user-speech may be permanently distorted owing to an ailment or past accident. However, owing to peculiarities of the conventional devices, the on-device and server's ASR mechanisms keep on executing such that the computations done at both server and on-device lead to redundancy and latency. Overall, there is observed a substantial delay at achieving at an accurate recognition of the voice, such that that the user largely remains deprived of the benefits.

The present subject matter at least renders a solution with respect to part (a) of FIG. 9 such that the arbiter 304 is able to learn after a few utterances that (for example) an acoustic module of the device (a forming a part of the ASR of the device) is falling short of the performance-level required for interpreting a distorted speech (as uttered by a sick man or a person suffering from voice-infirmity). Such learning or detection of performance-shortfall may be achieved at least by execution of example machine leaning (ML) algorithms by the arbiter 304. Accordingly, the arbiter 304 either increases buffering and processing thresholds for the acoustic module (i.e. $CB_A$ and $CP_A$) or lowers the confidence parameter 'C'. As a result, the output of the 'acoustic module' of the device is sent for interpretation and correction by the AM of the server. Finally, the output of the AM of the server is utilized for output generation via step 810, thereby leading to a reliable-interpretation of an otherwise distorted voice.

As may be understood, in respect of the output of rest of the ASR modules, i.e. pre-process, LM, ITN, NLU, the device output is considered via step 812 and server remains non-operational in respect of these.

However, in case the speech of the sick/person with voice-infirmity stops and another healthy person starts uttering normal and clear voice, then the arbiter lowers the buffer and processing threshold back such that only the output of the AM of the device via step 812 is used for final speech interpretation.

More specifically, part (a) of FIG. 9 illustrates the selection between the device and server as done in real-time. The same leads to prioritizing one or more speech-recognition modules within the server for processing the received speech based on observing performance of the speech-recognition modules of the device with respect to one or more scenarios pertaining to the receipt of the speech from the orator. In case of degradation of the performance, the buffering and processing threshold associated with the server are increased to thereby facilitate the server for processing the speech in said one or more scenarios.

As indicated in part (b) of FIG. 9, there are scenarios wherein the otherwise utters a clear speech while speaking. However, the speech comprises terms pertaining to the kitchen, e.g. speech related to how to cook food or use kitchen utensils for cooking.

As further indicated in part (c) of FIG. 9, there are scenarios wherein the otherwise utters a clear speech while speaking. However, the speech comprises a lot of background-noise, e.g. workshop related noise that somehow obscures or distorts the uttered speech within the audio-signal.

As further indicated in part (d) of FIG. 9, there are scenarios wherein the otherwise utters a clear speech while speaking. However, the speech comprises uncommon terms (i.e. jargons, colloquial phrases) pertaining to a given language generally.

However, owing to peculiarities of the conventional devices, the on-device and server based ASR mechanisms keep on executing simultaneously. For example, the AM module of the ASR within the device falls short of interpreting talk within the workshop as hidden in the background noise. In yet other example, the LM modules of the ASR within the device fall short of interpreting the speech full of uncommon jargons or colloquial language. Overall, the conventional devices do not have mechanism to know the AM (Acoustic model) or LM (language model) performance at different locations or conditions and hence are unable to adjust automatically.

The present subject matter at least renders a solution such that the arbiter 304 is able to learn after a few utterances that, for example, an acoustic-module or language model of the device (a forming a part of the ASR of the device) is falling short of the performance-level required for interpreting the speech at location such as workshop or a speech comprising a lot of uncommon linguistic words (e.g. jargons and colloquial sentences or foreign-language words). Again, such learning or detection of location-based performance-shortfall may be achieved at least by execution of example machine leaning (ML) algorithms by the arbiter 304. Accordingly, the arbiter 304 increases buffering and processing thresholds for the acoustic-module and the language module. As a result, the output of the 'language module' 'acoustic module' of the device is sent for interpretation and correction by the AM and LM of the server. Finally, the output of the AM and LM of the server is utilized for output generation via step 810, thereby leading to a reliable-interpretation of an otherwise distorted voice.

However, in case of 'kitchen' based scenario as depicted in part (b) of FIG. 9, the arbiter lowers buffering and processing threshold or maintains them constant, such that only the output of all of the modules within the device via step 812 are used for final speech interpretation. This is due to the fact for interpreting speech under kitchen based conditions, the device's performance is determined to be up to the mark and any server action may be uncalled for. Again, such learning or detection of 'up to the mark' performance of the device under the given location 'kitchen' may be achieved at least by execution of example machine leaning (ML) algorithms by the arbiter 304.

More specifically, part (b) to part (d) of FIG. 9 represent the selection between the device and server as done in real-time. Such selection comprises prioritizing one or more speech-recognition modules within the server for processing the received speech based on observing performance of the speech-recognition modules in the device and server with respect to one or more locations of the receipt of the speech. In case of degradation of the performance, the buffering and processing threshold associated with the server are increased or confidence parameter 'C' is re-calculated as lower-valued to thereby facilitate the server for processing the speech in respect of said one or more locations.

Part (a) and part (b) of FIG. 10 illustrate another example-operation in accordance with the present subject matter, thereby depicting the step 204, i.e. the decision-making for selecting the ASR (automatic speech recognition) mechanism of either the device or the server with respect to various scenarios.

As indicated in part (a) of FIG. 10, there are scenarios wherein the user is frustrated due to inaccurate results from the ASR of the device and resorts to shouting or increases volume to somehow convey his speech loud and clear. The present subject matter at least renders a solution such that the arbiter 304 senses that the user is now resorting to increased volume during uttering the speech and realizes that the user is dissatisfied with device-results. Such realization of 'user-expressed dissatisfaction through shouting' may be achieved at least by execution of example machine leaning (ML) algorithms by the arbiter 304. Accordingly, the arbiter 304 increases the buffering and processing thresholds associated with one or more of ASR modules of the server. As a result, the output of the one or more ASR modules of the device (e.g. pre-processing module) is sent for interpretation and correction by the corresponding ASR module (e.g. pre-processing module) of the server. Finally, the output of the AM of the server is utilized for output generation via step 810, thereby leading to a reliable-interpretation.

As indicated in part (b) of FIG. 10, there are scenarios wherein the user is frustrated due to partially accurate results from the ASR of the device and resorts to repetitively uttering the same query again and again to somehow convey his speech loud and clear. The present subject matter at least renders a solution such that the arbiter 304 senses that the user is now resorting to speech-repetition and realizes that the user is dissatisfied with device-results. Such realization of user-expressed dissatisfaction through repeated queries may be achieved at least by execution of example machine-learning (ML) algorithms. Accordingly, the arbiter 304 lowers buffering and processing thresholds for the language module. As a result, the output of the language-module of the device is sent for interpretation and correction by the LM modules of the server. Finally, the output of the LM of the server is utilized for output generation via step 810, thereby leading to a reliable-interpretation.

More specifically, part (a) of FIG. 10 and part (b) of FIG. 10 illustrate the selection in real-time which comprises prioritizing one or more speech-recognition modules within the server for processing the received speech based on observing a repetition of the speech, a loudly uttered speech or a combination thereof in respect of the speech received from the orator. The pre-processing to be done by the server is prioritized based on detecting substantial background-noise with respect to the received speech. A language model is prioritized within the server as the speech recognition module based on detection of linguistically different terms within the received speech.

Part (a) to part (d) of FIG. 11 illustrate another example-operation in accordance with the present subject matter, thereby depicting the step 204, i.e. the decision-making for selecting the ASR (automatic speech recognition) mechanism of either the device or the server with respect to various scenarios.

As indicated in part (a) of FIG. 11, there are scenarios wherein the device is of highly valued or premium category and the user wishes to obtain a fool-proof recognition of speech with robust quality control. The high-value of the device may be defined by at-least one of nature, type, category, characteristic of the device. The present subject matter at least renders a solution such that the buffering and processing thresholds may be set at a reference high value by default. As a result, the output of the ASR modules of the device is largely sent for interpretation and correction by the corresponding modules of the server, barring a few occasions wherein the device is sufficient itself as a speech-recognizer. Accordingly, in high-valued devices, it is the output of the server which is utilized via step 810 for rendering the speech recognition results, thereby leading to a reliable-interpretation.

As indicated in part (b) of FIG. 11, there are scenarios wherein the device is medium valued and merely requires a handful/less-complex speech-related commands for operation. In an example, a washing machine accepting voice commands may require simple voice commands to the tune of "WASH", "STOP", "START". Accordingly, the washing-machine itself may be equipped to recognize speech barring a few exception situation wherein the server-assistance may be required. Accordingly, the present subject matter at least renders a solution such that the buffering and processing thresholds may be set at a reference low value by default. As a result, the output of the ASR modules of the device is usually 'not' sent for interpretation and correction by the corresponding modules of the server barring exception occasions, e.g. device-malfunction. Accordingly, in medium-ranked devices, it is the mostly output of the device which is utilized via step 812 for rendering the speech recognition results.

As indicated in part (c) of FIG. 11, there are scenarios wherein the user of device has availed a premium subscription and accordingly wishes to obtain a fool-proof recognition of speech with robust quality control, irrespectively of the quality of the device being used for speech-recognition. The present subject matter at-least renders a solution such that the buffering and processing thresholds may be set at a reference high value by default, with respect to any device used by the user. As a result, the output of the ASR modules of the device is sent for interpretation and correction by the corresponding modules of the server to the maximum extent, barring a few occasions. Accordingly, for user availing a premium subscription, it is the output of the server which is utilized via step 810 for rendering the speech recognition results, thereby leading to a reliable-interpretation.

As indicated in part (d) of FIG. 11, there are scenarios wherein the user has availed a medium-valued subscription. In such case, the buffering and processing thresholds may be set at a reference low value by default. As a result, the speech recognition is restricted to the ASR modules of the device and the output of the ASR modules is sent externally for interpretation and correction by the corresponding modules of the server only under exception occasions, e.g. device-malfunction. Accordingly, for users availing an economical or budget subscription, it is the mostly output of the device which is utilized via step 812 for rendering the speech recognition results.

FIG. 12 shows yet another exemplary implementation in accordance with the embodiment of the invention; and yet another typical hardware configuration of the system 300 in the form of a computer system 1200 is shown. The computer system 1200 can include a set of instructions that can be executed to cause the computer system 1200 to perform any one or more of the methods disclosed. The computer system 1200 may operate as a standalone device or may be connected, e.g., using a network, to other computer systems or peripheral devices.

In a networked deployment, the computer system 1200 may operate in the capacity of a server or as a client user computer in a server-client user network environment, or as a peer computer system in a peer-to-peer (or distributed) network environment. The computer system 1200 can also be implemented as or incorporated across various devices, such as a personal computer (PC), a tablet PC, a personal digital assistant (PDA), a mobile device, a palmtop computer, a laptop computer, a desktop computer, a communications device, a wireless telephone, a land-line telephone, a web appliance, a network router, switch or bridge, or any other machine capable of executing a set of instructions (sequential or otherwise) that specify actions to be taken by that machine. Further, while a single computer system 1200 is illustrated, the term "system" shall also be taken to include any collection of systems or sub-systems that individually or jointly execute a set, or multiple sets, of instructions to perform one or more computer functions.

The computer system 1200 may include a processor 1202 e.g., a central processing unit (CPU), a graphics processing unit (GPU), or both. The processor 1202 may be a component in a variety of systems. For example, the processor 1202 may be part of a standard personal computer or a workstation. The processor 1202 may be one or more general processors, digital signal processors, application specific integrated circuits, field programmable gate arrays, servers, networks, digital circuits, analog circuits, combinations thereof, or other now known or later developed devices for analyzing and processing data. The processor 1202 may implement a software program, such as code generated manually (i.e., programmed).

The computer system 1200 may include a memory 1204, such as a memory 1204 that can communicate via a bus 1208. The memory 1204 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 1204 includes a cache or random access memory for the processor 1202. In alternative examples, the memory 1204 is separate from the processor 1202, such as a cache memory of a processor, the system memory, or other memory. The memory 1204 may be an external storage device or database for storing data. The memory 1204 is operable to store instructions executable by the processor 1202. The functions, acts or tasks illustrated in the figures or described may be performed by the programmed processor 1202 for executing the instructions stored in the memory 1204. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

As shown, the computer system 1200 may or may not further include a display unit 1210, such as a liquid crystal display (LCD), an organic light emitting diode (OLED), a flat panel display, a solid state display, a cathode ray tube (CRT), a projector, a printer or other now known or later developed display device for outputting determined information. The display 1210 may act as an interface for the user to see the functioning of the processor 1202, or specifically as an interface with the software stored in the memory 1204 or in the drive unit 1216.

Additionally, the computer system 1200 may include an input device 1212 configured to allow a user to interact with any of the components of system 1200. The computer system 1200 may also include a disk or optical drive unit 1216. The disk drive unit 1216 may include a computer-readable medium 1222 in which one or more sets of instructions 1224, e.g. software, can be embedded. Further, the instructions 1224 may embody one or more of the methods or logic as described. In a particular example, the instructions 1224 may reside completely, or at least partially, within the memory 1204 or within the processor 1202 during execution by the computer system 1200.

The present invention contemplates a computer-readable medium that includes instructions 1224 or receives and executes instructions 1224 responsive to a propagated signal so that a device connected to a network 1226 can communicate voice, video, audio, images or any other data over the network 1226. Further, the instructions 1224 may be transmitted or received over the network 1226 via a communication port or interface 1220 or using a bus 1208. The communication port or interface 1220 may be a part of the processor 1202 or may be a separate component. The communication port 1220 may be created in software or may be a physical connection in hardware. The communication port 1220 may be configured to connect with a network 1226, external media, the display 1210, or any other components in system 1200, or combinations thereof. The connection with the network 1226 may be a physical connection, such as a wired Ethernet connection or may be established wirelessly as discussed later. Likewise, the additional connections with other components of the system 1200 may be physical connections or may be established wirelessly. The network 1226 may alternatively be directly connected to the bus 1208.

The network 1226 may include wired networks, wireless networks, Ethernet AVB networks, or combinations thereof. The wireless network may be a cellular telephone network, an 802.11, 802.16, 802.20, 802.1Q or WiMax network. Further, the network 1226 may be a public network, such as the Internet, a private network, such as an intranet, or combinations thereof, and may utilize a variety of networking protocols now available or later developed including, but not limited to TCP/IP based networking protocols. The system is not limited to operation with any particular standards and protocols. For example, standards for Internet and other packet switched network transmission (e.g., TCP/IP, UDP/IP, HTML, HTTP) may be used.

Overall, at least by virtue of aforesaid description, the present subject at least renders a mechanism for intelligent real-time selection of ASR modules or speech-decoder stages between server and on-device components for automatic speech recognition and sending intermediate outputs to server in order to minimize re-computation, maximize accuracy and reduce latency. Several factors such as user, user location, past performance, server load, client load, QoS requirements etc are considered in making the decoder stage selection.

As depicted through the description of the preceding figures (e.g. FIGS. 9 to 11), the arbiter 304 executes example machine learning (ML) algorithms to evaluate the ASR performance of the device in light of a variety of factors (e.g. user-identity, user-location, time of the day) and various types of input audio signals (e.g. sick user, user feedback through shouting or repeated queries etc). Other factors may be past performance, server load, client load, QoS requirements etc. Based thereupon, the arbiter 304 dynamically selects between the device and server and prioritizes the sound decoding module (e.g. AM, LM, pre-processing). In an example, the ML algorithms may be supervised, unsupervised, reinforced and may include neural-networks (DNN, RNN, LSTM etc), decision tress, Naive Bayes Classification, Ordinary Least Squares Regression, Logistic Regression etc.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

The invention claimed is:

1. A method of performing speech recognition in an electronic device having an embedded speech recognizer, the method comprising:
   receiving an input-audio comprising speech at the electronic device;
   selecting in real time at least one speech-recognition circuit within at least one of the electronic device or a server for recognition of at least a portion of the speech based on a criteria which is based on at least one of:
   a speaker of the speech, or
   a quality of service associated with at least one of the electronic device or a networking environment thereof, the quality of service being determined based on at least one of a user-subscription with respect to the electronic device or a configuration of the electronic device defined by at least one of a nature, a type, a category, or a characteristic of the electronic device;
   based on the selected at least one speech-recognition circuit including at least one speech-recognition circuit of the server, sending an output of at least one speech-recognition circuit of the electronic device corresponding to the at least one speech-recognition circuit of the server for processing by the at least one speech-recognition circuit of the server; and
   determining uttered-speech within the input-audio based on an output of the selected at least one speech-recognition circuit.

2. The method of claim 1, wherein the selecting of the at least one speech recognition circuit within at least one of the electronic device or the server is further based on execution of a machine-learning algorithm followed by the criteria.

3. The method of claim 1,
   wherein the electronic device and the server comprise speech-recognition circuits, and
   wherein the speech-recognition circuits within the electronic device and server comprise at least one of:
   a pre-processing model;
   an acoustic-model (AM);
   a language-model (LM);
   an inverse text normalization model (ITN); or
   a natural language understanding (NLU) model.

4. The method of claim 1,
   wherein the criteria is further based on past-performance of speech-recognition circuits, and
   wherein the past-performance of speech-recognition circuits is logged with respect to at least one of:

an environment comprising multiple speakers;
a location of the speaker; and
a time of day at which the speech is received from the speaker.

5. The method of claim 1, wherein the criteria to defined in terms of the speaker of the speech relates to a feedback received therefrom as at least one of:
repetition of the speech by the speaker;
repetition of the speech with increased loudness; or
increased loudness from the speaker later during the speech.

6. The method of claim 1, wherein the quality of service is further defined based on at least one of:
a current-occupancy of the server; or
a current-occupancy of a network connecting the server and the electronic device.

7. The method of claim 1, wherein the selecting comprises prioritizing one or more speech-recognition modules circuits within the server for processing the speech based on one or more of:
observing performance of speech-recognition circuits of the electronic device with respect to one or more scenarios pertaining to the receiving of the speech from the speaker; and
in case of degradation of the performance, modifying buffering and processing threshold associated with the server to facilitate the server for processing the speech in the one or more scenarios.

8. The method of claim 1, wherein the selecting in real-time comprises prioritizing one or more speech-recognition circuits within the server for processing the speech based on one or more of:
observing performance of speech-recognition circuits in the electronic device and server with respect to one or more locations of reception of the speech; and
in case of degradation of the performance, modifying buffering and processing threshold associated with the server to facilitate the server for processing the speech with respect to the one or more locations.

9. The method claim 1, wherein the selecting in real-time comprises prioritizing one or more speech-recognition circuits within the server for processing the speech based on one or more of:
observing a repetition of the speech, a loudly uttered speech, or a combination thereof with respect to the speech received from the speaker;
prioritizing pre-processing to be done by the server based on detecting substantial background noise with respect to the speech; and
prioritizing a language model within the server as a speech recognition circuit based on detection of linguistically different terms within the speech.

10. The method of claim 1, wherein the selecting in real-time comprises a real-time calculation of buffering and processing thresholds as the criteria for speech-recognition by the server.

11. An electronic device for performing speech recognition, the electronic device comprising:
a processor; and
a memory storing instructions which, when executed by the processor, cause the processor to:
receive an input-audio comprising speech,
select at least one speech-recognition circuit within at least one of the electronic device and or a server for recognition of at least a portion of the speech based on a criteria which is based on at least one of:
a speaker of the speech; or
a quality of service associated with at least one of the electronic device or a networking environment thereof, the quality of service being determined based on at least one of a user-subscription with respect to the electronic device or a configuration of the electronic device defined by at least one of a nature, a type, a category, or a characteristic of the electronic device,
based on the selected at least one speech-recognition circuit including at least one speech-recognition circuit of the server, send an output of one or more of at least one speech-recognition circuit of the electronic device corresponding to the at least one speech-recognition circuit of the server for processing by the at least one speech-recognition circuit of the server, and
determine uttered-speech within the input-audio based on an output of the selected at least one speech-recognition circuit of the electronic device or the server.

12. The electronic device of claim 11, wherein the selecting of the at least one speech-recognition circuit within at least one of the electronic device or the server is further based on a machine-learning algorithm followed by the criteria.

13. The electronic device of claim 11,
wherein the electronic device and the server comprise speech-recognition circuits, and
wherein the speech-recognition circuits within the electronic device and server comprise at least one of:
a pre-processing model;
an acoustic-model (AM);
a language-model (LM);
an inverse text normalization model (ITM); or
a natural language understanding (NLU) model.

14. The electronic device of claim 11,
wherein the criteria is further based on past-performance of speech-recognition circuits, and
wherein the past-performance of speech-recognition circuits is logged with respect to at least one of:
an environment comprising multiple speakers;
a location of the speaker; or and
a time of day at which the speech is received from the speaker.

15. The electronic device of claim 11, wherein the quality of service is further defined based on at least one of:
a current-occupancy of the server; or a current-occupancy of a network connecting the server and the electronic device.

* * * * *